US006543052B1

(12) United States Patent
Ogasawara

(10) Patent No.: US 6,543,052 B1
(45) Date of Patent: Apr. 1, 2003

(54) INTERNET SHOPPING SYSTEM UTILIZING SET TOP BOX AND VOICE RECOGNITION

(75) Inventor: Nobuo Ogasawara, San Diego, CA (US)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/350,784

(22) Filed: Jul. 9, 1999

(51) Int. Cl.$^7$ .......................... H04N 5/445; H04N 7/173
(52) U.S. Cl. .......................... 725/60; 725/110; 725/133; 348/734
(58) Field of Search .......................... 345/327; 348/734, 348/725, 10, 12, 13, 14.01, 14.02, 14.03, 14.04, 14.05, 14.08, 14.12; 455/6.2, 6.3; 704/275; 725/131, 133, 136, 60; H04N 7/16, 7/173

(56) References Cited

U.S. PATENT DOCUMENTS

| | | | |
|---|---|---|---|
| 5,138,649 A | * 8/1992 | Krisbergh et al. | 379/56 |
| 5,247,580 A | * 9/1993 | Kimura et al. | 381/42 |
| 5,249,218 A | 9/1993 | Sainton | 379/59 |
| 5,319,454 A | * 6/1994 | Schutte | 348/5.5 |
| 5,512,935 A | 4/1996 | Majeti et al. | 348/9 |
| 5,621,456 A | * 4/1997 | Florin et al. | 725/41 |
| 5,636,211 A | 6/1997 | Newlin et al. | 370/465 |
| 5,640,193 A | * 6/1997 | Wellner | 348/7 |
| 5,721,583 A | * 2/1998 | Harada et al. | 348/12 |
| 5,732,216 A | 3/1998 | Logan et al. | 395/200.33 |
| 5,850,218 A | * 12/1998 | LaJoie et al. | 345/327 |
| 5,886,691 A | * 3/1999 | Furuya et al. | 348/2 |
| 5,901,366 A | * 5/1999 | Nakano et al. | 455/575 |
| 5,973,756 A | * 10/1999 | Erlin et al. | 348/734 |
| 6,069,567 A | * 5/2000 | Zawilski | 340/825.22 |
| 6,130,726 A | * 10/2000 | Darbee et al. | 348/734 |
| 6,181,326 B1 | * 1/2001 | Takahashi | 348/10 |
| 6,188,985 B1 | * 2/2001 | Thrift et al. | 348/734 |
| 6,275,991 B1 | * 8/2001 | Erlin et al. | 725/141 |
| 6,304,573 B1 | * 10/2001 | Hicks, III | 370/401 |

* cited by examiner

Primary Examiner—Chris Grant
(74) Attorney, Agent, or Firm—Christie, Parker & Hale, LLP

(57) ABSTRACT

An Internet-based electronic shopping system hosted on a television-set-top-box combination controlled by a remote control unit. The set-top box (STB) includes a tuner, an internal or external modem and/or cable modem, configured to communicate with an Internet service provider over the appropriate transmission media. The STB also includes purpose-type application software such as voice recognition software and bar code recognition software to support an electronic shopping system. The STB further includes an external interface for connection to a multiplicity of external peripheral devices, such as an interphone, VCR, video camera, printer, and the like. The remote control unit includes a keypad, a microphone, an optional speaker, an optional digital camera, and an optional speaker. Data input to an Internet shopping Web program accessed through the STB's Web browser may thus be made through the microphone, keypad, and optionally through the digital camera. If the remote control unit includes the digital camera, bar code information may be scanned by the remote control unit and transmitted to the STB for identifying an item to be purchased. The remote control unit is also capable of being used as a cordless telephone or videophone, and might also function as a handset for an interphone when the appropriate communication links are connected to the STB through its external interface. When the system is used as a videophone, videographic images of a party on the other end of the line is displayed on the TV screen via a pop-up window.

33 Claims, 6 Drawing Sheets

INTERNET SHOPPING SYSTEM UTILIZING SET TOP BOX AND VOICE RECOGNITION

FIELD OF THE INVENTION

The present invention relates generally to electronic shopping systems, and more particularly, to an Internet shopping system hosted on a television-set-top-box combination including a remote controller with voice recognition capabilities.

BACKGROUND OF THE INVENTION

The expansion of personal computers (PCs) into homes of average consumers has also expanded the usage of the Internet by such consumers, and with it, has opened a new avenue of shopping, specifically, Internet shopping. Currently, computers are the main source of Internet access. However, there are still many families who do not own a PC or find PC operation to be difficult. For those people, alternate means must be made available to allow them to reap the benefits of the Internet without having to interact with a computer.

To solve the above problem, efforts have been made in the prior art to provide Internet access through common household electronics equipment such as a television and set-top box combination. For instance, Philips-Magnavox and Sony market a set-top box with Internet capabilities under the trademark WebTV®. U.S. Pat. No. 5,512,935 to Majeti et al., also discloses a set-top box connected to a home controller and personal computer combination. The home based equipment in Majeti is able to communicate with an Internet service provider through a variety of cable distribution means including a public switched telephone network via a modem.

Although the television-set-top-box combination may be easier to operate than a PC, it may nonetheless require a substantive amount of time and effort to learn the operations of the set-top box, especially the operation of the remote controller working the set-top box. The more the functions provided by the set-top box, the more keys there will be on the remote controller for the user to learn. The learning of all the functions in the remote controller keypad might be a laborious task for the user. Even if the user has learned the functions of all the keys, the maneuvering between various keys on the remote controller during Internet shopping is inefficient and cumbersome.

In addition, an optional wireless keyboard and/or a virtual keyboard is often used when alphabetical data or complicated input is required. A virtual keyboard is a full keyboard display on a CRT screen which is operated by the remote control unit by designating key positions with arrow and enter keys. The use of such wireless keyboards or virtual keyboards makes data input more laborious for the user.

The use and learning of remote control functions become even more cumbersome when the user must learn to use other keypads, buttons, switches, and/or dials to work other household devices such as the VCR, interphone, video camera, printer, fax, and so on.

Accordingly, there is a need for a remote controller which is able to communicate with a set-top box by means other than the keypad. Because voice input is easier and more efficient than keypad input, such remote controller should have voice recognition capabilities to allow users to provide oral commands during Internet shopping.

The user should also have access to other household devices directly through the set-top box and remote controller so as to provide a central means for accessing those devices. In this way, the user does not have to learn other mechanisms for controlling the devices. Although efforts have been made in the prior art to provide a universal multimedia access device adapted for communicating multimedia information between the device and various application specific modules as disclosed in U.S. Pat. No. 5,636,211 to Newlin et al., the prior art does not disclose or suggest operating a set-top box with interface means to other household devices via voice commands.

SUMMARY OF THE INVENTION

These and other objects are accomplished in accordance with the present invention by an electronic shopping system hosted on a television-set-top-box combination controlled by a remote control unit which provides additional functionalities to the system.

In accordance with one aspect of the invention, the electronic shopping system includes a remote control unit with at least a keypad and a microphone for providing keypad data and voice data to the set-top box (STB). The STB comprises means for connecting to an Internet service provider and a Web browser configured to receive input data from the remote control unit. The Web browser generates an audio-visual display on a display unit in response to the input data, allowing the user to effectuate the electronic shopping.

In a second aspect of the present invention, the remote control unit comprises a digital visual image recording means for providing videographic data to the STB. This allows bar code images to be transmitted to the STB for identifying an item to be purchased.

In a third aspect of the present invention, a voice generator coupled to the Web browser converts character data to output voice data. The output voice data is transmitted to a speaker in the remote control unit for providing audio output to the user. The speaker also allows the remote control unit to function as a wireless phone or as a handset for an interphone or videophone.

In a fourth aspect of the present invention, the STB comprises an external interface with a household peripheral device such as an intercom, interphone, videophone, VCR, video camera, printer, fax, and the like.

DETAILED DESCRIPTION OF THE INVENTION

In general terms, the present invention is directed to an Internet-based electronic shopping system hosted on a televisionset-top-box combination controlled by a remote control unit which provides additional functionality to the system. The set-top box (STB) includes a tuner and audio visual output functions for television reception capability. The tuner is configured to communicate with an Internet service provider over either satellite or through a cable medium and the STB also includes a modem capability for Internet service provider communication over a telephone subscriber line interface. In addition to its conventional functions, the STB includes an external interface such as an IEEE1394 interface, USB, RS232C, SCSI, and the like, for connection to a multiplicity of external peripheral devices, such as an interphone, VCR, video camera, printer, and the like.

The STB is configured to provide a user with Internet access in a manner such as currently provided by Web TV and further includes purpose-type application software such as voice recognition software and bar code recognition software to support an electronic shopping system. Application programs are either hosted on and loaded from a mass storage media such as a hard disk drive or are downloaded from an external server via a telephone modem connection, a cable or satellite connection and/or wireless broadcast means.

The remote control unit is configured to include a conventional keypad and further includes a microphone, an optional speaker, an optional digital camera, and a provision for wireless transmission capability in order to send data to the STB. When the STB is configured with voice recognition software, an Internet shopping Web program or HTML text may be accessed through the STB's Web browser and data input may be made by either voice, the remote control unit's keypad, a virtual keyboard displayed on the CRT, or by an optional wireless keyboard. Voice input is recognized by the voice recognition software and recognized data is transferred to the Internet shopping Web program.

When the remote control unit is configured to include a digital camera, bar code information may be scanned by the remote and bar code video data may be transmitted to the STB and recognized as bar code data by bar code recognition software. Merchandise information is transmitted to a store's web server via any one of the Internet links described above.

When the remote control unit is configured with microphone, speaker and digital camera, it is also able to be used as a cordless telephone or video phone and might also function as a handset for an interphone when the appropriate communication links are connected to the set top box through its external interface. When the system is used as a videophone, videographic images of a party on the other end of the line may be displayed on the TV screen via a pop-up window.

Figure 1:
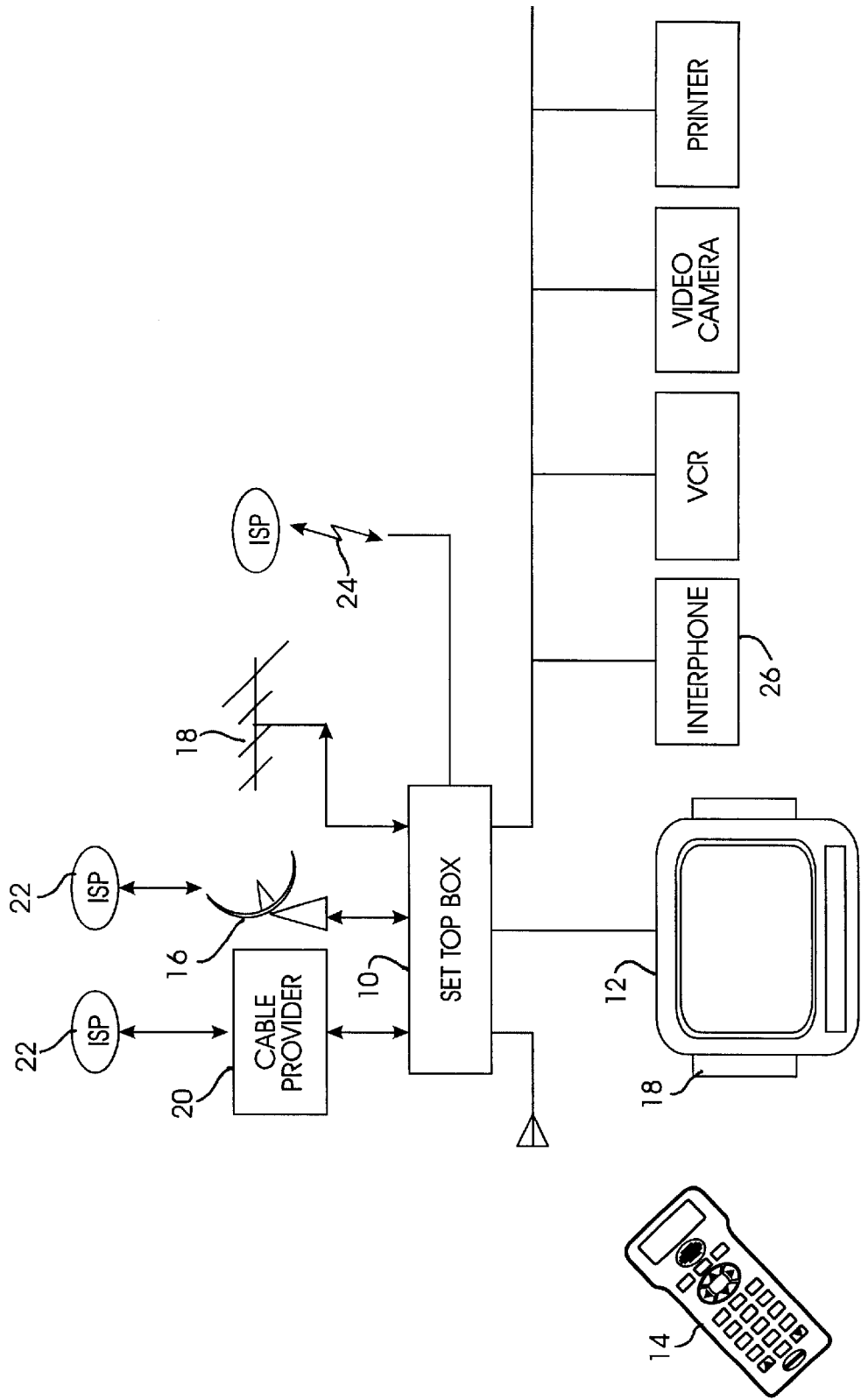
FIG. 1 is an exemplary, simplified, semi-schematic block diagram of an electronic shopping system including a television set, a set-top box, and a remote control unit in accordance with the present invention.

Considering the foregoing summary of the features of the system and method of the present invention, FIG. 1 depicts a simplified, semi-schematic block diagram of an exemplary electronic shopping system including a STB 10, television 12, and remote control unit 14. The STB 10 receives television signals from satellite 16, over-the-air broadcast 18 (also referred as aerial broadcast), or via cable through a cable provider 20, for performing conventional television reception functions. The STB also communicates with an Internet Service Provider (ISP) 22 over the satellite 16 medium or via cable through the cable provider 20. In addition, the STB 10 allows for ISP 22 communication over a telephone subscriber line 24 interface.

Various peripheral devices 26 are also controlled through the STB 10. Such devices might include an interphone, VCR, video phone, printer, fax, and the like. The centralized control of such devices 26 through the STB 10 helps facilitate their access and management.

The television 12 set is coupled to the STB 10 and permits audio and display functions to the system. The display function is provided by the television screen and may include display of television programs, HTML pages, and video images created by the peripheral devices 26. The audio function is provided by one or more speakers 28 either resident within the television 12 set, or externally coupled to the television set. The television 12 unit may be an analog TV, a digital TV, or the like.

Figure 2:
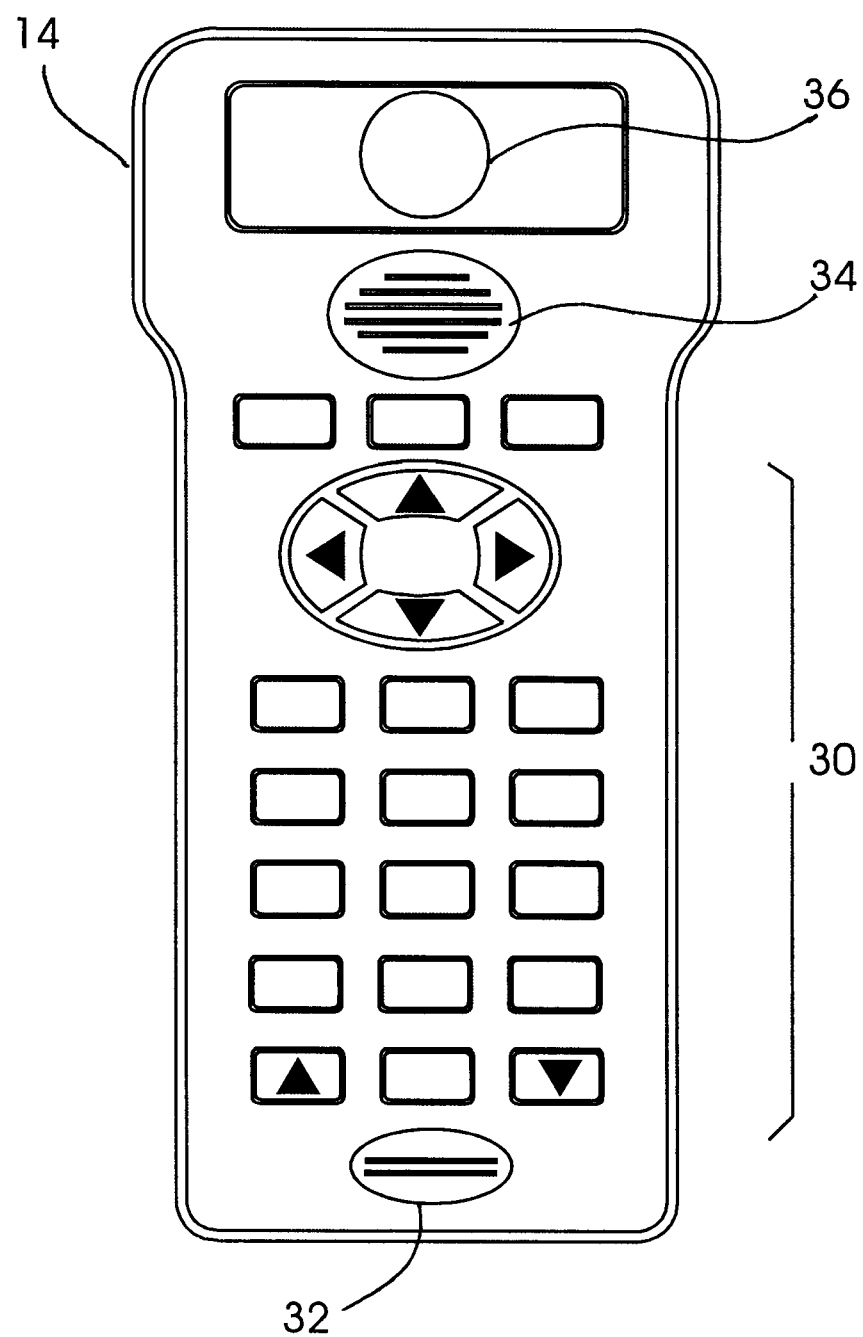
FIG. 2 is a simplified, semi-schematic illustration of an exemplary implementation of the remote control unit of FIG. 1.
Figure 3:
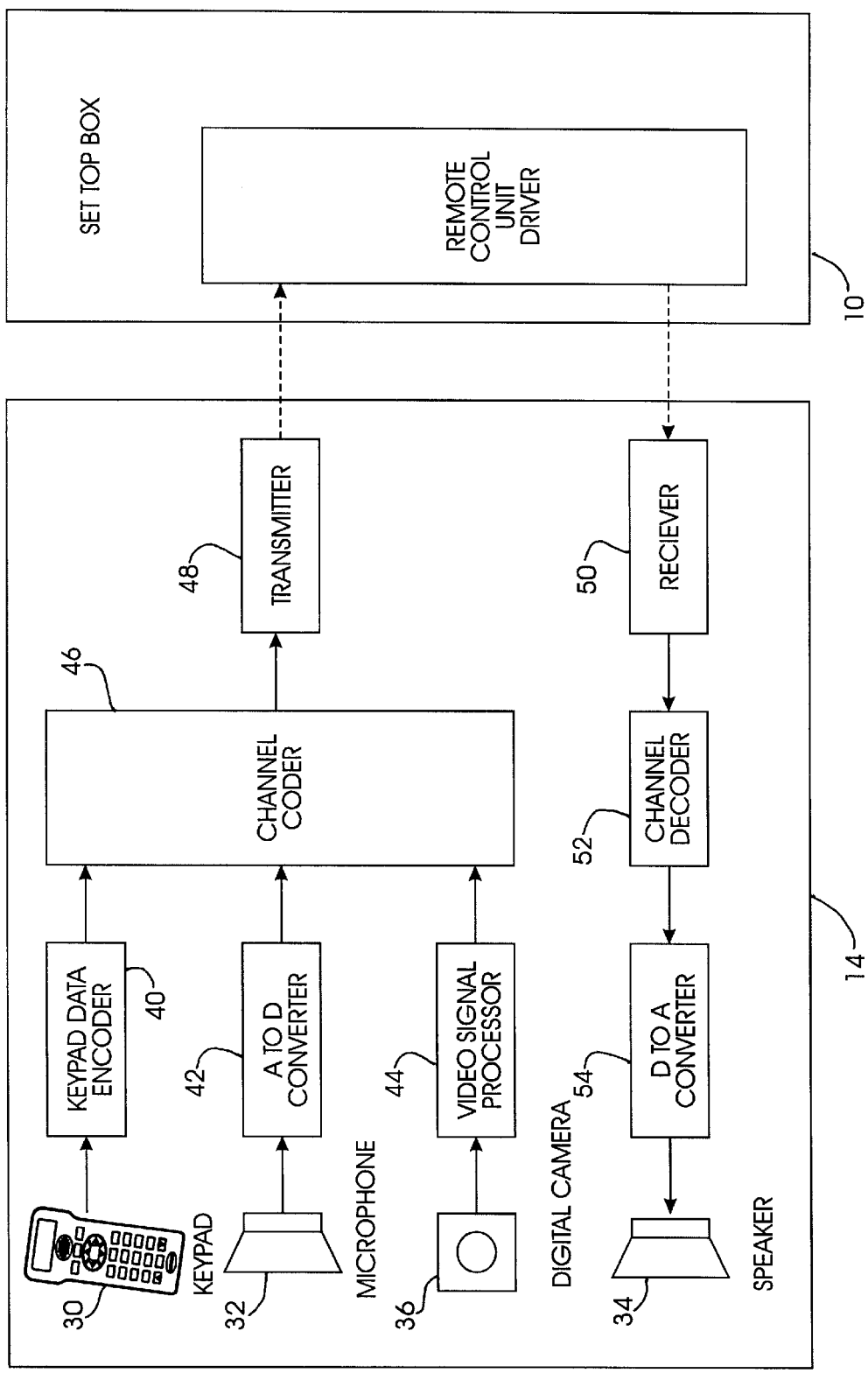
FIG. 3 is an exemplary, semi-schematic functional block diagram of the remote control unit of FIGS. 1 and 2.

The remote control unit 14 is also in communication with the STB 10 and provides additional functionalities to the system. FIG. 2 is an exemplary illustration of the remote control unit 14 and FIG. 3 is its functional block diagram in an exemplary, semi-schematic form. As in a conventional remote controller, the remote control unit 14 illustrated in FIG. 2 includes a keypad 30 for allowing input of keypad data to the STB 10. The keypad 30 in the described embodiment comprises a power key, various numeric or alpha character keys, function keys (menu key, clear key, enter key, etc.), and arrow keys. A user depresses the keys on the keypad 30 to specify a particular operation the user wants to perform. For instance, up and down arrow keys along with the enter key might be used to select data displayed on the television screen.

The remote control unit 14 also includes a microphone 32 for capturing voice data upon an utterance by the user. Thus, a user may provide oral commands to the system during Internet shopping instead of keypad commands, making it easier and more pleasant for an average user to use the system. The use of voice recognition, unlike other situations, should be more efficient and more accurate for Internet shopping because it entails simple selection operations which require the utterance of only short phrases for recognition purposes.

In an alternative embodiment, the remote control unit 14 also includes a speaker 34 for output of voice messages to the user upon receipt of voice data from the STB 10. Such voice messages may include operation guidance, error messages, and the like. The speaker 34 can be operational either alone or in conjunction with the television speakers 28. Alternatively, the speaker 34 in the remote control unit 14 can be disabled and the television speakers 28 used in its place. The inclusion of the speaker 34 along with the microphone 32 also allows the remote control unit 14 to operate as a handset for cordless phone, interphone, and/or video phone functions that might be available through the STB 10.

A digital visual image recording means such as a digital video camera 36 is also incorporated into the remote control unit 14 for providing additional functionalities to the system to promote easier Internet shopping. The camera 36 might comprise either gray scale or color video data. Preferably, the video image data will be in color to adequately represent the user's personal appearance, i.e., hair color, clothing color, and the like, when the camera 36 is used for video phone or interphone purposes. Although the camera is described as a digital video camera 36, it should be understood by those having skill in the art that an apparatus for capturing still images rather than a full-motion video image can be used to implement the system according to the invention. Accordingly, the camera 36 might comprise a digital still camera, a video camera or any other type of device that outputs a digital image.

In addition, the camera 36 is preferably mounted on a hinge on one end of the remote control unit 14 for allowing the camera 36 to be rotated at a 90 or 180 degree angle. The rotation of the camera not only facilitates video capture for video phone or interphone functions, but also eases the capture of barcode images when ordering groceries or other barcoded items via the Internet, as described in further detail below.

Referring now to FIG. 3, user input from the keypad 30, microphone 32, or digital camera 36 is processed by the remote control unit 14 before transmission to the STB 10. Input from the keypad 30 is sent to a keypad data encoder 40 for translation of the keypad data into a keypad code. Specifically, when a user depresses a key on the keypad 30, the keypad data encoder 40 encodes the depressed keypad position information to a binary keypad code, such as an ASCII character data or a hexadecimal code for transmission to the STB 10.

Input from the microphone 32, on the other hand, is sent to an analog to digital converter 42 for converting voice data from analog data to digital data according to well known principles. Video images captured by the digital camera 36 are sent to a video signal processor 44 for generating videographic data also according to well known principles.

The input data from the three input media, i.e. the keypad code from the keypad data encoder 40, voice data from the analog to digital converter 42, and videographic data from the video signal processor 44, are then sent to a channel coder 46 in the remote control unit 14. The channel coder 46 combines the input data from the three input media by a predetermined coding method and transmits the coded data to the STB 10 through a transmitter 48. The predetermined coding method allows the STB 10 to recognize and decode the data received from the different input media of the remote control unit 14. The coding method, according to one embodiment, entails placing a header and a delimeter for demarcating the beginning and end of particular types of input data. In this scenario, the channel coder 46 transmits the input data along with the corresponding header and delimeter, for decoding by the STB 10.

The transmitter 48 in the remote control unit 14 allows for wireless transmission of the coded data to the STB 10. Infra Red (IR), radio frequency (RF), Ultra High Frequency (UHF), or any other wireless technology may be used for the wireless transmission. If IR technology is used, the transmitter 48 may generally be equipped with an LED. If RF or UHF technology is used, the transmitter 48 may generally be equipped with an antenna or the like.

According to one embodiment, the remote control unit 14 also includes a receiver 50 for wireless receipt of data from the STB 10. The data is then sent to a channel decoder 52 for decoding and extracting the data received for a particular medium. In the illustrated embodiment, the remote control unit 14 is equipped to receive voice data from the STB 10. The voice data, once extracted by the channel decoder 52, is transmitted to a digital to analog converter 54 and the converted analog voice data is sent to the speaker for generating corresponding sound waves to the user. It should be appreciated by those having skill in the art, that necessary variations can be made to the remote control unit without departing from the spirit and scope of the invention should other types of data other than voice data be sent by the STB 10 to the remote control unit 14. For instance, if the remote control unit 14 is equipped with a display unit (not shown), the STB 10 might send video images to the receiver 50 and the receiver 50 might submit them to the channel decoder 52 for extracting the video images. From there, the video images might be submitted to a video signal processor (not shown) for converting the extracted video images to videographic data to be displayed on the display unit.

If the remote control unit 14 receives only one type of data from the STB 10 (e.g. voice data or video data) as is described in the current embodiment, the channel decoder 52 is no longer necessary for deciphering the type of data received given that the inputted data will always be of the same type. In such instance, the channel decoder 52 may be eliminated from the remote control unit 14.

Figure 4:
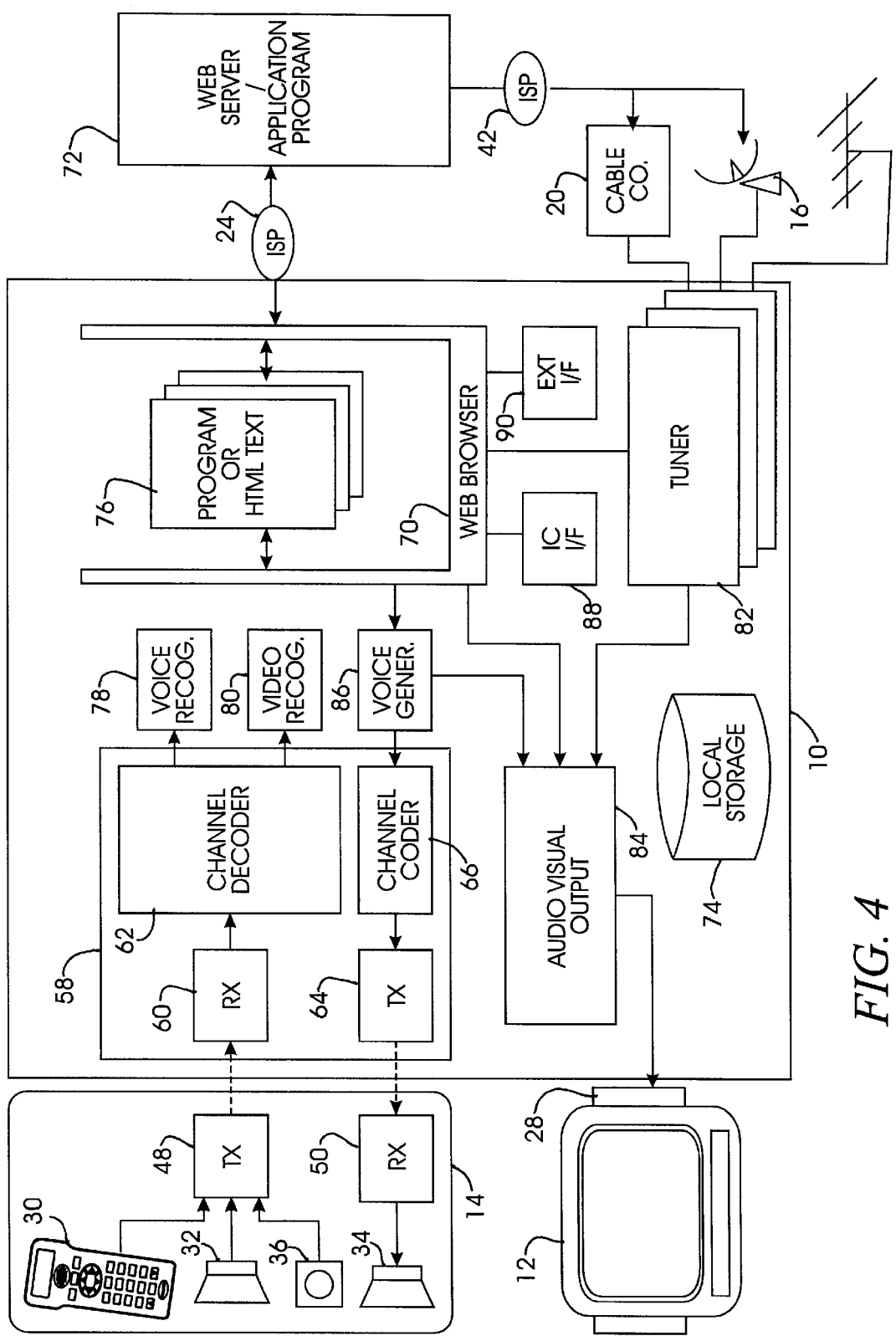
FIG. 4 is an exemplary, semi-schematic block diagram of the set top box of FIG. 1.

FIG. 4 is an exemplary, semi-schematic block diagram of the STB 10 of FIG. 1. The STB 10 comprises a tuner 82 and an audio visual output unit 84 for conventional television reception capabilities. The tuner 82 is further configured to provide Internet connection with a Web server 72 via the ISP 42, through the satellite 16 medium or via cable through the cable provider 20. The STB 10 is also equipped with a modem (not shown) for communicating with the Web server 72 via the ISP 22, through telephone subscriber lines 24.

The Web server 72 provides various software programs 76, such as HTML pages, Internet shopping Web programs, and other application software programs to a Web browser 70 through the Internet connection. The software programs 76 may be downloaded and stored in a local storage 74 unit. The local storage 74 may suitably comprise a hard disk drive or drive array, a PCMCIA programmable memory card, a high-capacity flexible media cartridge and floppy drive combination, ROM, FROM (Flash ROM), SRAM or DRAM memory chips, or the like. In addition to downloaded software programs, the local storage 74 may also store electronic program guide data including scheduling information of television programs, as well as miscellaneous user-specific information, such as the user's e-mail address, shopping list information, personal notes, etc.

The local storage 74 may further store software and data for a voice recognizer, video data recognizer, voice generator, remote control unit driver, Web Browser, and any other type of application. These types of software and data can be pre-loaded, downloaded, and/or modified. Modification can be made by downloading or loading the software and/or data from a local medium such as an IC card, a floppy disk, or the like.

The STB 10 also includes a remote control unit driver 58 having an STB receiver 60, STB channel decoder 62, STB transmitter 64, and STB channel coder 66. The STB receiver 60 receives input data from the remote control unit 14 via wireless means. In an alternative embodiment, the STB receiver 60 also receives keyboard data from a wireless keyboard 68. The wireless keyboard 68 is operational through IR, RF, UHF, or any other wireless technology applicable to the remote control unit 14.

The STB receiver 60 submits the received input data to the STB channel decoder 62 for decoding the multiple medium data to a keypad code, voice data, and/or videographic data. According to one embodiment, the STB channel decoder 62 examines the header preceding the input data for identifying the input medium of the data. The channel decoder then extracts the data between the header and the delimiter and transmits the extracted data for further processing, if required, based on the identified medium.

During Internet shopping, if the identified medium is the keypad 30, the keypad code is extracted by the STB channel decoder 62 and submitted to the downloaded software program 76 through the Web browser 70.

If the identified medium is the microphone 32 or digital camera 36, the extracted voice data or videographic data undergoes further processing. Voice data is submitted to a voice recognizer 78 configured with voice recognition software for converting the voice data to character data according to a number of conventional voice recognition algorithms.

In the alternative embodiment, voice recognizer is included in the remote control unit. In this case, the remote control unit converts the voice data to character data and transfers the character data to the set top box.

Videographic data is submitted to a video data recognizer 80 which, in the described embodiment, is configured with barcode recognition software. The barcode recognition software further includes pattern recognition and barcode decode capabilities for deciphering barcode images inputted to the system via the digital camera 36 (FIG. 3). Most retailers today attach a Universal Product Code (UPC) which is printed or tagged on each item of merchandise to be sold, as a barcode. Conventionally, the barcode might include an item's Stock Keeping Unit (SKU) code as well as other additional information pertaining to a specific item of merchandise. The barcode data is converted to a UPC or SKU code by the barcode recognition software and transmitted to a downloaded purchase transaction program through the Web browser 70. With this capability, a user can transmit an order for an item via the Internet by simply transmitting the barcode image of the item. The barcode image should be available to the user if the user has the packaging of the item on hand. Barcode data may also be available in catalogues or in old receipts from retailers offering the desired merchandise.

In an alternative embodiment, the video data recognizer is included in the remote control unit. The remote control unit recognizes captured bar code image data and converts it to a bar code, such as UPC, SKU or the like, and transfers the bar code data to the set-top box.

It should be noted, at this point, that those skilled in the art will appreciate various other codes, indicia, text, and the like, being used instead of the barcode for item identification purposes. Thus, the barcode recognition software may suitably be modified, without departing from the spirit or scope of the invention, to decipher any other types of item identifiers.

In an alternative embodiment, the visual data recognizer 80 is configured with other types of image recognition software, such as an optical character recognition (OCR) program. If the visual data recognizer 80 is configured with an OCR program, handwritten notes (e.g. a handwritten shopping list) can be converted into text character codes for either input to the downloaded software program 76 through the Web browser 70, or for storage in the local storage 74 unit for later use.

A downloaded software program 76 can therefore receive input from the remote control unit 14 and/or the wireless keyboard 62. In addition, the downloaded program 76 has access to the local storage unit 74, an IC card interface 88 unit, and an external interface 90, if needed. Details of the IC card interface 88 unit and the external interface 90 are provided below.

The downloaded software program 76, in response to input data, outputs graphic and character display data through the Web browser 70 for conveyance to an audio visual output unit 84. The audio visual output unit 84 transfers the graphic and character display data to the television 12 for display thereon.

The audio data from the downloaded software program is transferred to a voice generator 86 configured with a voice generating program that converts the audio data to digital voice data. The digital voice data is transferred to the STB channel coder 66 which, as the channel coder 46 (FIG. 3) in the remote control unit, combines all the output data by a predetermined coding method and transmits the coded data to the speaker 34 in the remote control unit 14 through the STB transmitter 64. Although the STB 10 of FIG. 4 only illustrates voice data as being output to the remote control unit, a person skilled in the art, as described above in conjunction with FIG. 3, should appreciate other types of data being transmitted to the remote control unit 14. However, in the instance where only one type of data is capable of being output to the remote control unit 14, the channel coder 68, like the channel decoder 52 (FIG. 3) in the remote control unit, becomes unnecessary and may be eliminated if desired.

The voice data created by the voice generator 86 may optionally be transferred to the television speakers 28 through the audio visual output unit 84. The television speakers 28 may be made operational alone or in conjunction with the remote control speakers 34.

In addition to the above, the STB 10 includes an IC card interface 88 configured to read information from and write information to an IC, or smart card. The IC card and IC card interface 88, in combination, provide a suitable means for authenticating an STB 10 as a valid receiver of particular TV services. The IC card can also provide secured payment methods (credit card, prepaid electronic cash, etc.), storage of personal information, personal identification, and the like. While referred to as an IC card, the card is a personal memory card or data card which looks and feels much like an ordinary credit card. The IC card may be either contact based or contactless. The simplest contact-type card might be a magnetic tape storage stripe affixed in a particular location on its reverse side. Alternatively, a contact or contactless IC card may comprise a microprocessor, an electrically erasable field-programmable read-only memory (EEPROM), a Flash ROM (FROM) and, optionally, circuitry for inductively receiving an RF power signal. In its second configuration, the IC card is capable of capacitively transferring data signals between the card and the IC card interface 88 and may be interrogated, programmed or reprogrammed by read/write circuitry comprising the card interface 88.

An additional I/O device is provided in the STB 10 in the form of an external interface 90 for centralized access of various peripheral devices 26 (FIG. 1). The external interface 90 allows communication between the peripheral devices 26 and the STB 10. As a result, a two-way exchange of information is made possible between the peripheral devices 26 and the STB 10. This information can include video signals, data signals, voice signals, audio signals, image signals, and control signals. The external interface 90 might comprise an IEEE 1394 interface, USB, RS232C, SCSI (small computer system interface), LAN, IrDA, and the like. The peripheral devices 26 might comprise an intercom, interphone, VCR, video camera, video phone, printer, fax machine, and the like.

As an example, to accomplish interphone functionalities through the STB 10, an interphone outside the user's front gate should include video-camera capabilities. The interphone is connected to the STB 10 through the external interface 90. Control of the interphone is made by an interphone application software in the STB 10. The application software might be loaded from the local storage 74 unit, downloaded from the Web server 72 through the Web browser 76, or preloaded into the STB 10. The videographic picture captured by the interphone outside the user's door is displayed on the television 12 via a pop-up window. Voice capabilities are provided by the microphone 32 in the remote control unit 14. Audio capabilities are provided by the remote control speaker 34, television speakers 28, or both. It can be appreciated, therefore, that access to the interphone through the STB 10 facilitates such access by allowing the user to receive an interphone call from a visitor outside the home without having to move away from a television program that he or she might be watching. In addition, the user is spared from having a separate interphone receiving unit since the television-STB combination, along with the remote control unit 14, acts as the receiving unit.

Figure 5A:
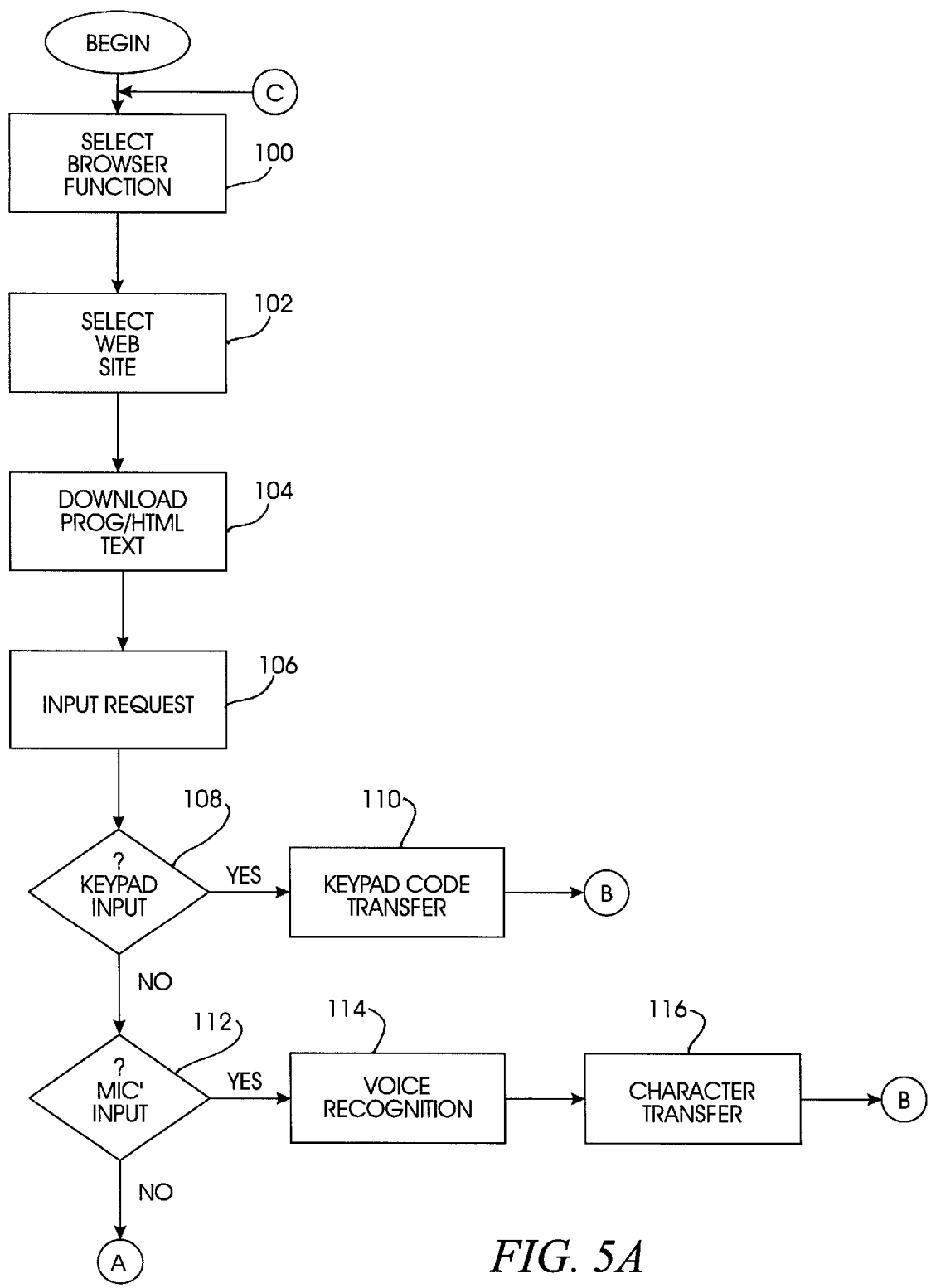
FIGS. 5A and 5B are exemplary flow diagrams of an Internet shopping transaction using the set-top box and the remote control unit in accordance with the present invention.
Figure 5B:
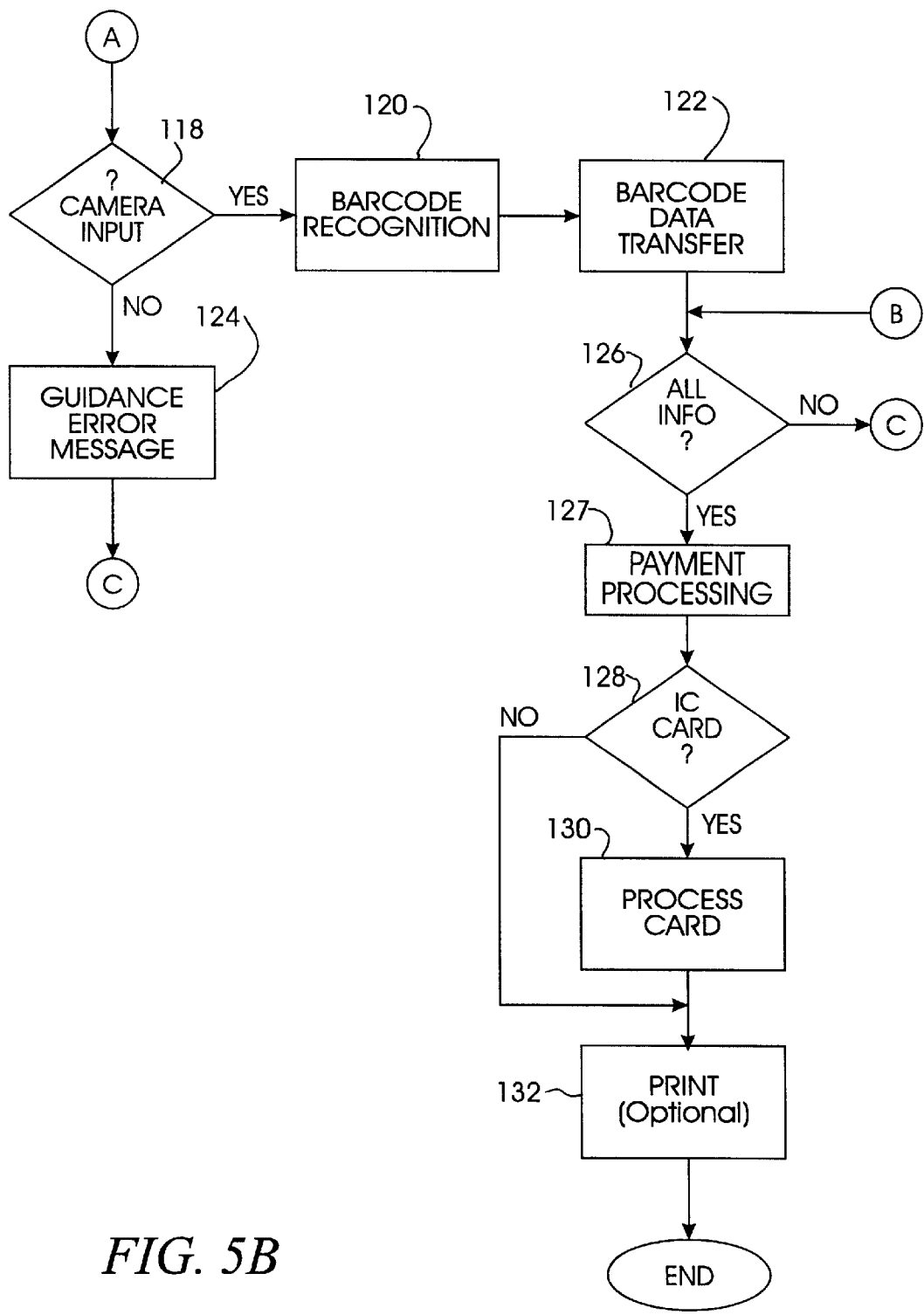

Referring now to FIGS. 5A and 5B, operation of the electronic shopping system of the present invention is discussed in detail. An Internet shopping transaction starts by selecting a Web browser function 100 from a menu of functions available through the STB 10. The menu is displayed on the television screen and selection is made via the keypad 30 on the remote control unit 14. Alternatively, selection may be made through the microphone 32 by orally voicing the selection. Selection of the Web browser function causes display of the Web browser 70 on the television set. The user then selects a Web site from the browser 102 by directly keying-in a web site address or selecting a site from a menu of available Internet shopping sites. The menu may be customized by the user based on his or her favorite Internet shopping sites, or may reflect a list of the Internet sites most recently accessed by the user.

Once a shopping Internet site has been specified, the Web server downloads the corresponding client purchase transaction program and/or HTML text 104 to the STB through the Web browser. In addition, needed programs such as a voice recognition program, video data recognition program, voice generating program, and IC card interface program, if not already preloaded in the STB, are loaded from the local storage unit 74 or downloaded from the Web server 72.

The downloaded client purchase transaction program displays an initial display on the television screen along with introductory visual and/or audio guidance, and requests for user selection of a purchase item 106. The audio guidance is effectuated through the remote control speaker 34, television speakers 28, or both.

If keypad input is detected 108, the corresponding keypad code is extracted by the STB channel decoder and transferred to the transaction program 110 through the Web browser. If microphone input is detected 112, voice recognition is performed by converting the voice data to the corresponding character data. The extracted character data is then transferred to the transaction program 116. Detection of a camera input 118 causes, in the illustrated embodiment, the running of the barcode recognition program 120. In alternative embodiments, other video data recognition programs such as an OCR program may be run if applicable. Barcode recognition causes the corresponding UPC or SKU numeric data to be transferred to the transaction program as an input 122. If no input is received, or an erroneous input is received, an error message or operation guidance is provided 124 to the user via the television screen and speakers 28, and/or via the remote control speaker 34.

The data input process continues until all necessary selections have been made by the user to complete an item selection 126.

The client purchase transaction program in the STB 10 is in communication with the server purchase transaction program on the Web server 72. Upon client selection of an item, the server program retrieves information corresponding to the selected item from a Price Lookup (PLU) Table. In the described embodiment, all merchandise information is maintained in the PLU Table. The PLU Table is, in turn, stored and maintained in the Web server 72 database. The PLU Table suitably comprises a merchandise specific information set. The merchandise specific information set may be arranged in a variety of ways, but is most advantageously configured as sequential entries, with each entry specific to a particular piece of merchandise. A merchandise entry might include the store's SKU number which is identified to a particular product's UPC by a suitable conversion routine. A merchandise entry might further include a text string giving the brand or trade name of the product and including a generic description of the product. In addition to the SKU number and identifying string, each item entry also might include a price field.

Upon review of the selected merchandise information, and after a decision to purchase the merchandise, the user proceeds to payment processing 127. The user has the option of using the IC card for making payment for the item 128. If the IC card is to be used, the card is processed 130 by the IC card interface 88. The processing might include extracting a customer ID number stored in the card and transmitting the ID to the Web server 72 for determining whether the user is a preferred customer participating in a preferred customer plan which might allow him or her reward points or discounted prices. The purchase amount might then be charged to the user's account for being billed at a later time.

Whether or not the IC card is used as a method of payment, the purchase order information can be printed 132 on a printer coupled to the STB 10 through the external interface 10 for record-keeping purposes, if a printer is connected to the set top box 10.

Accordingly, there has been brought to the art of electronic shopping systems, a system and method that allows Internet shopping by utilizing a television-set-top-box combination in conjunction with a remote control unit with voice recognition capabilities. Internet shopping is facilitated by allowing users to input voice commands through the microphone in the remote control unit. The optional camera also facilitates Internet shopping by allowing users to simply input the barcode image of the item to be purchased. The external interface in the STB and the optional speaker in the remote control unit also facilitate the operation of peripheral devices by providing a centralized access to those devices.

While the invention has been described with respect to particular illustrated embodiments, those skilled in the art and technology to which the invention pertains will have no difficulty devising variations which in no way depart from the scope and spirit of the present invention. For example, while the illustrated embodiments have been described in connection with a set-top box, it will be appreciated that the present system and method may be devised within the television set itself, without the need of a separate set-top box. Accordingly, the present invention is not limited to the specific embodiments described above, but rather, is defined by the scope of the appended claims.

What is claimed is:

1. In an electronic shopping system including a television set coupled to a set-top box, the set-top box being configured to access the Internet through a Web browser resident in the set-top box, the set-top box further being configured to communicate with a remote control unit, the remote control unit comprising:

a first input medium including a keypad for providing keypad data to a shopping application program accessed through the Web browser;

a second input medium including a microphone for providing voice data to the shopping application program accessed through the Web browser; and a transmitter coupled to the first input medium and the second input medium for transmitting the keypad data and the voice data to the shopping application program as input for effectuating a purchase.

2. The remote control unit of claim 1 further comprising a third input medium including a digital visual image recording means for providing videographic data, the third input medium being coupled to the transmitter for transmitting the videographic data to the set-top box.

3. The remote control unit of claim 1 further comprising:
a receiver for receiving output voice data from the set-top box; and
a speaker coupled to the receiver for generating sound waves corresponding to the received output voice data.

4. The remote control unit of claim 1 further comprising a voice recognizer for converting voice data to character data, the character data being transmitted by the transmitter to the set-top-box.

5. In an electronic shopping system including a television set and a remote control unit configured with a microphone, the remote control unit providing input data to a set-top box coupled to the television set, the set-top box comprising:
a receiver for receiving the input data from the remote control unit, the input data including voice data from the microphone;
a voice recognizer for converting voice data to character data;
means for accessing a shopping application program;
means for providing the input data to a shopping application program for effectuating a purchase; and
an audio-visual output unit coupled to a Web browser for generating an audio-visual display on a display unit in response to the input data.

6. The set-top box of claim 5 further comprising:
a voice generator coupled to the Web browser for converting character data to output voice data; and
a transmitter for transmitting the output voice data.

7. The set-top box of claim 5 further comprising an external interface with a household peripheral device.

8. The set-top box claim 5 further comprising an interface with a customer ID card.

9. The set-top box of claim 5 further comprising a local storage unit for storing and retrieving application software programs.

10. The electronic shopping system of claim 5, wherein the display unit is a television monitor.

11. An electronic shopping system comprising:
a remote control unit comprising:
at least two input media for providing input data, the first input medium including a keypad for providing keypad data, and the second input medium including a microphone for providing voice data; and
a transmitter coupled to the input media for transmitting the input data;
a set-top box in communication with the remote control unit, the set-top box comprising:
a receiver for receiving the input data from the transmitter in the remote control unit;
means for accessing a shopping application program;
means for providing the input data to the shopping application program for effectuating a purchase; and
an audio-visual output unit coupled to the Web browser for generating an audio-visual display on a display unit in response to the input data.

12. The electronic shopping system of claim 11, wherein the remote control unit further comprises a third input medium including a digital visual image recording means for providing videographic data to the set-top box.

13. The electronic shopping system of claim 12, wherein the remote control unit comprises means for bar code recognition.

14. The electronic shopping system of claim 12, wherein the set-top box comprises means for bar code recognition.

15. The electronic shopping system of claim 11, wherein the set-top box further comprises:
a voice generator coupled to the Web browser for converting character data to output voice data; and
a transmitter for transmitting the output voice data; and
the remote control unit further comprises:
a receiver for receiving the output voice data; and
a speaker coupled to the receiver for generating sound waves corresponding to the received output voice data.

16. The electronic shopping system of claim 11, wherein the set-top box further comprises an external interface with a household peripheral device.

17. The electronic shopping system of claim 11, wherein the set-top box further comprises an interface with a customer ID card.

18. The electronic shopping system of claim 11, wherein the set-top box is coupled to a local storage unit for storing and retrieving application software programs.

19. The electronic shopping system of claim 11, wherein the display unit is a television monitor.

20. The electronic shopping system of claim 11 further including a wireless keyboard system for communicating with the set-top box.

21. The electronic shopping system of claim 11, wherein the remote control unit is further configured with a speaker and is capable of functioning as a wireless phone.

22. The electronic shopping system of claim 11, wherein the remote control unit is further configured with a speaker and is capable of functioning as a handset for an interphone.

23. The electronic shopping system of claim 11, wherein the remote control unit is further configured with a speaker and is capable of functioning as a handset for a videophone.

24. An electronic shopping method comprising the steps of:
accessing a data communications network through a set-top box;
accessing a shopping application program from the data communications network;
entering input data through a remote control unit having at least a keypad for entering keypad data and a microphone for entering voice data;
converting the voice data to character data;
transmitting the input data from the remote control unit to the shopping application program for effectuating a purchase;
receiving audio-visual data from the shopping application program in response to the input data; and
displaying the audio-visual data on a display unit.

25. The method of claim 24, wherein the step of entering input data comprises the step of entering videographic data through the remote control unit further including a digital visual image recording means.

26. The method of claim 25, wherein the videographic data comprises bar code data.

27. The method of claim 24 further comprising the steps of:

receiving character data from the shopping application program;

converting the character data to output voice data;

transmitting the output voice data to a remote control unit having a speaker; and generating sound waves corresponding to the received output voice data.

28. The method of claim 24 further comprising the step of interfacing with a household peripheral device through the set-top box.

29. The method of claim 24 further comprising the step of interfacing with a customer ID card through the set-top box.

30. The method of claim 24 further comprising the step of interfacing with a local storage unit for storing and retrieving application software programs.

31. The method of claim 24 further comprising the step of entering input data through a wireless keyboard system.

32. The remote control unit of claim 1, wherein the second input medium further provides voice data to a plurality of devices coupled to the set-top box for interacting with the plurality of devices via voice from the remote control unit.

33. In an electronic shopping system including a television set and a remote control unit configured with a plurality of input media types, the remote control unit providing input data to a set-top box coupled to the television set, the set-top box comprising:

a receiver for receiving the input data from the remote control unit, the input data being generated by the plurality of input media types;

a decoder for decoding the input data into a plurality of individual data sets, each individual data set being associated with a particular input media type, the decoder determining whether further processing is needed for a particular individual data set based on its associated input media type;

means for accessing a software application program;

means for providing the input data to the software application program; and means for receiving an output from the software application program in response to the input data.

\* \* \* \* \*